Aug. 8, 1944.　　M. G. DE SIMONE　　2,355,150
PRESSURE STERILIZER AND COOKER
Filed July 15, 1942　　2 Sheets-Sheet 1
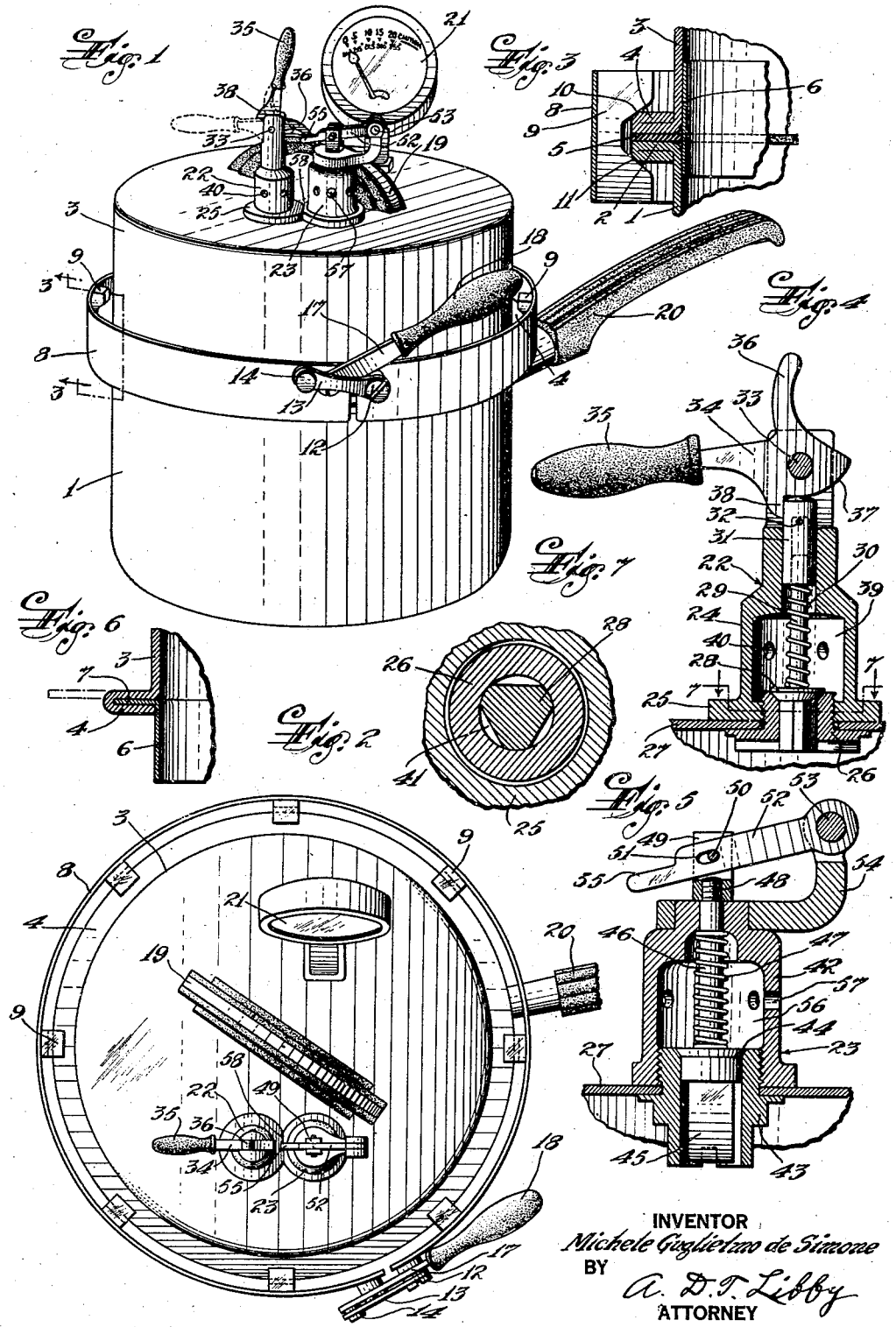
INVENTOR
Michele Guglielmo de Simone
BY
A. D. T. Libby
ATTORNEY Aug. 8, 1944.     M. G. DE SIMONE     2,355,150
PRESSURE STERILIZER AND COOKER
Filed July 15, 1942     2 Sheets-Sheet 2
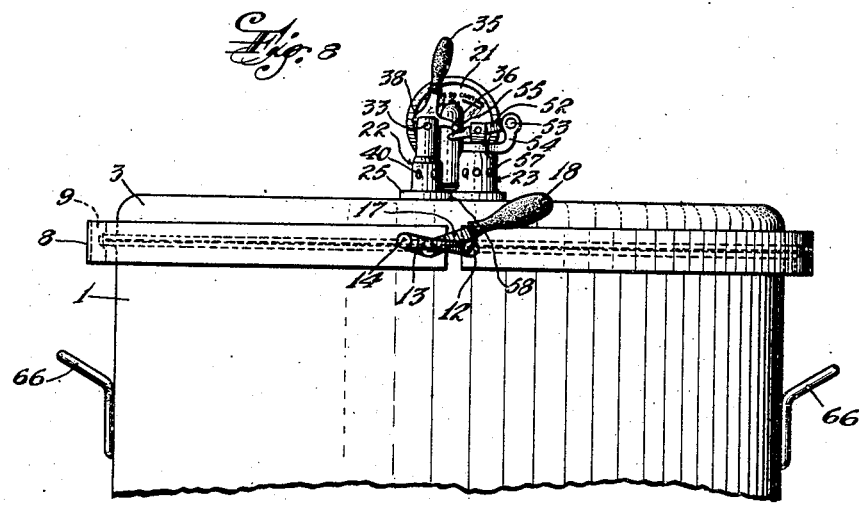
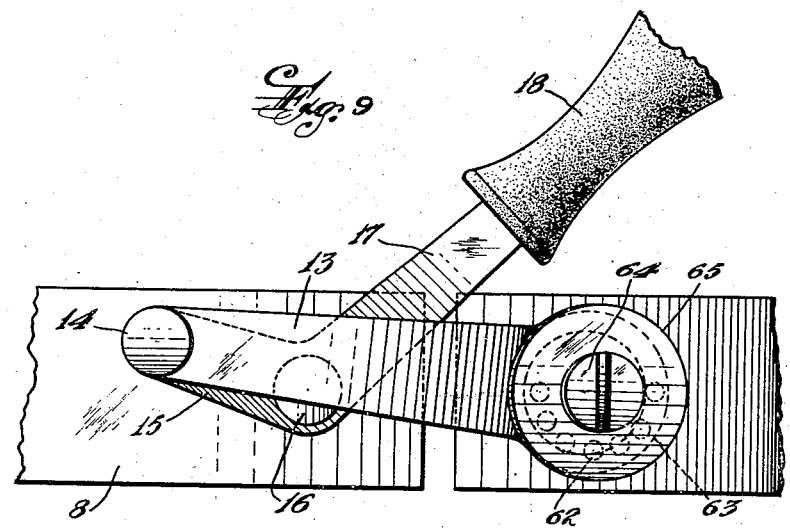
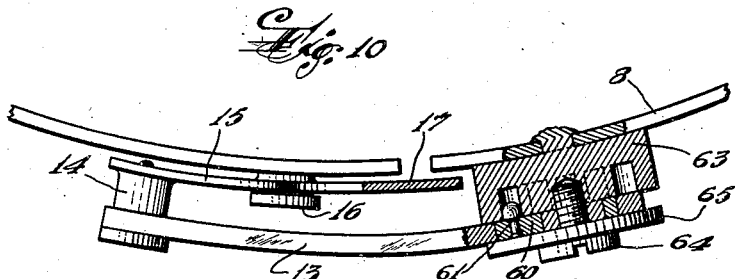
INVENTOR
Michele Guglielmo de Simone
BY
A. D. T. Libby
ATTORNEY Patented Aug. 8, 1944

2,355,150

UNITED STATES PATENT OFFICE 2,355,150

PRESSURE STERILIZER AND COOKER

Michele Guglielmo de Simone, Stapleton, Staten Island, N. Y.

Application July 15, 1942, Serial No. 451,082

8 Claims. (Cl. 220—85)

This invention relates to a vapor pressure structure which may be utilized as a pressure cooker or sterilizer.

One of the objects of my invention is to provide a pressure sterilizer and/or cooker structure which has the following advantages: An easily removable cover; pressure release means which are normally fixed to the cover but which may be detached if necessary; pressure release means which may be quickly and safely operated for releasing the pressure within the structure whereby the cover may be promptly removed; a structure in which the pressure release means will operate to prevent any accidental explosion and which release means may be reset without replacement of any parts; a vapor pressure structure in which the cover is held to the receptacle by clamping means, the parts of which may be adjusted to take up for compression of the gasket used between the cover and the receptacle; a pressure structure which may be made out of drawn metal thereby greatly reducing the weight and cost of manufacture. Other advantages will be discerned from a reading of the following specification taken in connection with the annexed drawings, wherein:

Figure 1 is a perspective view of one form of the complete structure, the handle on the control valve being shown in pressure position, and in released position in dotted lines.

Figure 2 is a top plan view of Figure 1.

Figure 3 is a fragmentary section through the union between the cover and the receptacle about on the line 3—3 of Figure 1.

Figure 4 is a view through the control valve, partly in section and partly in elevation, showing the control lever in released position.

Figure 5 is a view similar to Figure 4 but through the safety valve, the parts being shown in pressure position.

Figure 6 is a fragmentary view of the edge portion of the cover showing a modified form of carrying the cover guide member.

Figure 7 is a section on the line 7—7 of Figure 4.

Figure 8 is a side elevation of a modified form of structure.

Figure 9 is a view on an enlarged scale from that shown in Figure 1 of the lever mechanism for clamping the cover to the receptacle, but also showing adjustable means for compensating for compression of the gasket between the cover and the receptacle.

Figure 10 is a part plan, sectional view of the structure shown in Figure 9.

In the various views, wherein like numbers refer to corresponding parts, 1 is a receptacle which I prefer to make out of drawn metal such as steel properly treated and finished to prevent rusting. The upper edge of the receptacle 1 has a turned-over portion forming a flange 2. A cover 3 is similarly formed from sheet metal and is provided with a flange 4 to cooperate with the flange 2. A gasket 5 is utilized between the flanges 2 and 4 for sealing the cover to the receptacle. Preferably, the cover is provided with an annular ring 6 which is fastened to the cover in any satisfactory manner. The lower portion of the ring 6 projects over the flange 4 of the cover and acts as a positioning and guide member for the cover in the receptacle 1 as clearly indicated in Figure 3.

In Figure 6 the guide member 6 may be provided with a flange 7 which is clamped between bent-over portions of the cover 3 in forming the flange 4. The cover 3 is held to the receptacle 1 by means of a strap or band 8 which carries at arcuately spaced points around its inner periphery a plurality of members 9 having inversely positioned surfaces 10 and 11 for gripping the flanges 4 and 2 of the cover and receptacle as is clearly indicated in Figure 3.

Referring to Figure 1, a stud 12 is fastened near one end of the band 8 and to this stud is connected a link 13 carried by a stud 14 which is mounted on the end 15 of a lever, more clearly shown in Figures 9 and 10, pivoted by a stud 16 to the other end of the band 8. The lever has a main arm 17 which carries a handle 18. Since the lever operating the band has two arms 15 and 17 at an angle to each other, it will be seen that when the lever is raised upwardly, this will force the link 13 to the right causing the ends of the band to move apart and to loosen the wedge members 9 from their engagement with the flanges 2 and 4 on the receptacle and cover, so that the cover may be readily raised by means of its handle 19. It may be noted at this point that the receptacle 1 has a handle 20 fastened thereto. Besides the handle 19, the cover carries a gauge 21 which may be calibrated to indicate the pressure and proper cooking or sterilizing point for the structure. The cover also carries a control valve 22 and a safety valve 23.

The control valve shown in Figure 4 includes a hollow post 24 having a flange 25 which is threaded to receive a clamping nut or flanged plug 26 for fastening it to the top 27 of the cover. The plug 26 has a valve seat to receive a valve 28. The valve 28 has a stem 29 extending upwardly into a small bore in the post 24. The stem 29 carries a spring 30 and above the spring an elongated cap 31. The cap 31 has a vent hole 32 therein so as to allow quick action of the cap on the stem 29. Pivotally mounted by a stud 33 on the upper part of the post 24 is a lever 34 having a handle 35. The lever 34 has an arm 36 extending toward the safety valve 23 for a purpose to be hereinafter described. The lever 34 also has a cam surface 37, the function of which will also be later described, and a stop portion 38 for engaging the cap 31 when the lever 34 is in released position as indicated in Figure 4. The post 24 has an enlarged chamber 39 with orifices 40 therein to allow the escape of gas or vapor under pressure when the valve 28 is raised. The lower end of the valve 28 has relieved portions 41, as indicated in Figure 7, to allow the passage of gas or vapor upwardly past the valve 28 into the chamber 39.

The safety valve 23 has a flanged hollow post 42 which is threaded to receive a flanged threaded plug 43 as shown in Figure 5. A valve 44 is seated in the plug 43. The lower end of the valve has a polygonally shaped extension 45 and an upwardly extending stem 46 on which is positioned a spring 47. The upper end of the stem 46 is threaded at 48 to engage a threaded clevis-like member 49 which in turn carries a pin 50 positioned in an elongated slot 51 in a lever 52 that is pivoted at 53 on an arm 54 carried by the upper end of the post 42. The free end of the lever 52 has a seat portion 55 which is adapted to be engaged by the arm 36 of the lever 34 carried by the control valve 22. Similarly to the control valve, the safety valve has a chamber 56 with orifices 57 therein to allow the escape of gases or vapor from within the receptacle when the valve 44 is raised.

These two valves 22 and 23 are mounted on the cover in close juxtaposition, their flanges being preferably cut away at 58 to form positioning engagement seats to assist in holding them in alignment, whereby the arm 36 will engage the seat 55 on the safety valve structure.

After the receptacle is filled and the cover put on, the lever 35 is thrown into the position shown in Figure 1. This causes the cam surface 37 to push down on the elongated cap 31 compressing the spring 30, applying a predetermined amount of pressure on the valve 28. At the same time the arm 36 engages the seat 55 on the lever 52. It will be understood that the spring 47 is made so that, in combination with the pressure of the lever 36 on the seat 55 of the lever 52, the safety valve 44 is then set to withstand a pressure not greatly in excess of the highest pressure at which food is to be cooked or the sterilizer to be operated, but at much less than the amount of pressure it would take to cause the cooker to explode.

By way of illustration, the spring 30 is made and calibrated so that when the lever 35 is thrown into the position shown in Figure 1, whereby the cam portion 37 applies downward pressure on the cap 31 and compresses the spring 30, the pressure then required to raise the valve 28 from its seat is that corresponding to the normal cooking pressure; for example, 15 pounds per square inch; so that if the pressure within the cooker rises above this point, the valve 28 will open to relieve the pressure and hold it within the cooker at the cooking point.

In the event that the pressure in the receptacle goes too high, the valve 44 is raised, allowing the vapor under pressure to escape into the chamber 56 and out through the orifices 57. At the same time, the lever 52 is raised through the medium of the engageable stem 46 of the lever 52 which will move the arm 36 of the control valve 22 to cause the lever 34 to move to the position shown in Figure 4, at which time there is little or no compression on the spring 30, and the valve 28 will readily open, thereby further speeding up the release of the pressure within the receptacle. The spring 47 is made and calibrated so as to apply only a normal pressure on the valve 44 of a small amount, for example, five pounds per square inch, but when the arm 36 is thrown into engagement with the seat 55 of the lever 52, then the total pressure on the valve seat 44 is on the order somewhat above the release pressure of 15 pounds per square inch of the valve 28 as heretofore stated.

At the end of any cooking or sterilizing period, the handle 35 may be moved from the position of Figure 1, full lines, to that shown in Figure 4 which will immediately release the valve 28, allowing the gases or vapor under pressure in the receptacle to quickly escape. This movement of the handle 35 as just noted also relieves pressure of the arm 36 on the lever 52 and will allow the valve 44 to open, thereby speeding up the release operation.

In the modified form of cover band construction shown in Figures 9 and 10, the link 13 carries a disc 60 having a pin 61 adapted to enter any one of a plurality of holes 62 located in the stud 63 carried by one end of the band 8. As shown in Figure 9, the holes 62 are positioned eccentrically with respect to the axial center of the stud 63. By removing the screw 64 and washer 65, the disc with its pin 61 may be shifted so that the pin 61 engages any one of the holes 62, whereby the effective length of the link 13 is varied to compensate for the compression of the gasket 5 between the flanges 2 and 4 of the receptacle and cover.

A further modification is shown in Figure 8 in which the cover 3 is more shallow than the cover shown in Figure 1, and the receptacle 1 is provided with suitable side handles 66.

The combination of the control and safety valves described may be used on other types of pressure vessels than those shown herein; for example on vessels of the double-kettle type, and other modifications may be made in the details of construction without departing from the spirit of my invention or the scope of the appended claims.

What I claim is:

1. In a pressure sterilizer and cooker having a receptacle and a cover with means for fastening the cover to the receptacle; a control valve structure having a control valve per se and a safety valve structure having a safety valve per se carried by the cover, the control valve structure having a hand-operated part with a projecting arm, while the control valve per se has cooperating members extending upwardly into operative engagement with said hand-operated and projecting arm, the safety valve structure having a lever operatively connected to the safety valve per se and extending into operative relation with the arm on the control valve structure when the hand-operated part and arm are in valve-closing position, said lever acting, on movement of the safety valve by a predetermined pressure within the receptacle, to move said arm on the control valve structure so as to permit the control valve to open.

2. A pressure sterilizer and cooker as set forth in claim 1, further defined in that the control valve structure includes a flanged hollow post with internal threads on the flanged end, a plug positioned on the inside of the cover and having a threaded end engaging the threads in the flanged post to hold the flange against the outer top surface of the cover, a valve seat in the plug and a valve fitting in said seat having a stem projecting upwardly into the post, a spring carried by the stem, an elongated cap positioned on the stem against one end of the spring, the cap having a vent in its upper end, a hand-operated lever carried by the upper end of the post, the lever having a cam surface for engaging the end of said cap to apply pressure through the spring to said valve, and a release arm forming part of the hand-operated lever extending into operative relation with the lever on said safety valve, the post having orifices therein above said valve seat whereby when the hand-operated lever is in released position pressure gases within the receptacle find an exit through the valve and said openings.

3. A pressure sterilizer and cooker as set forth in claim 1, further defined in that the control valve structure includes a flanged hollow post of two diameters both internally and externally, with threads at the flanged end of the post, a threaded plug passing through a hole in the cover and engaging the threads on said post to hold the post on the cover, a valve seat formed in the inner end of the plug, a valve carried by the plug fitting in said seat and having an inner extenson extending downwardly through the plug and formed to pass gases within the receptacle to pass the seat when the valve is raised, the valve having an upwardly extending stem carrying a spring and a cap, a lever pivotally mounted on the upper end of the post having a cam surface to engage the end of the cap whereby pressure is applied through the cap and spring to the valve to hold it securely on its seat when the lever is in pressure-operating position, a stop means for holding the lever in idle position, an arm carried by the lever for cooperation with the lever on the safety valve structure when the hand-operated lever of the control valve is set in cooking position, that part of the post of larger diameter having orifices therein above the said valve seat to allow the escape of gases from the receptacle when the valve is moved to open position.

4. A pressure sterilizer and cooker as set forth in claim 1, further characterized in that the safety valve structure includes a flanged hollow post positioned on the cover closely adjacent the control valve structure, with internal threads at the flanged end thereof, a screw-threaded plug passing through the cover into engagement with the threads in said post holding the same to the cover, said plug having a valve seat on its inner end, the valve member having a part fitting in said seat and an end extending into the plug but formed to allow gases to pass by the valve at a predetermined pressure within the receptacle, the post having extra openings to allow said gases to escape therefrom, the valve having an upwardly extending threaded stem, a spring carried on the stem within the post, a support fastened to the upper end of the post extending outwardly and upwardly therefrom, a lever pivoted to said extended end of said support, a clevis having threads at one end to be engaged by the threaded end of said valve stem, means for forming a compensating joint between the clevis and the lever, one end of which is adapted to extend into operative engagement with a part of the control valve structure.

5. A pressure sterilizer and cooker as set forth in claim 1, further characterized in that the safety valve structure includes a hollow post with gas exit openings therein, means for fastening said post on the exterior of the cover closely adjacent the control valve, a valve positioned within the post and fastening means having a stem extending upwardly through the upper end of the post, a support member carried by the upper end of the post through which said stem extends, a lever pivotally mounted on said support, a clevis fastened to said stem and having a pin passing through the two arms of the clevis and the said lever, the lever having a longitudinal slot therein to receive said pin and also having a portion adapted to extend into operative relation with part of the control valve structure.

6. A pressure relief device comprising a valve body having an inlet for attachment to a pressure chamber, a valve for controlling flow through the body, a spring device for controlling operation of the valve, a hand operated lever mounted on said body for cooperation with said spring device, an extension on said lever, a second valve body having an inlet for connection with said pressure chamber, a spring-pressed valve for controlling flow through said second valve body, a lever mounted on said second valve body and engaging a stem on the last mentioned valve, said second lever having releasable engagement with said lever extension whereby pressure of a predetermined value is released by said first valve only and pressure of a higher predetermined value operates the second valve to disengage said second lever and said extension to release the spring pressure on said first valve and allow fluid to escape through both valves.

7. Control means for a vapor pressure apparatus comprising a control valve structure having a control valve member adapted to be positioned to open in response to fluid pressure within the apparatus, a stem on said valve member carrying a spring, one end of which engages the valve member, a safety valve structure having a valve member adapted to be positioned to open in response to excess fluid pressure within the apparatus, means for interlocking said valve members, said means including a lever on the control valve structure having a cam surface for compressing said spring and an arm extending into releasable engagement with a lever on the safety valve structure, said latter mentioned lever being positioned to respond to the opening movement of the safety-valve member to move said first mentioned lever arm to release position whereby said control valve member may open in response to fluid pressure.

8. Control means for a vapor pressure apparatus comprising a control valve structure having a control valve member adapted to be positioned to open in response to fluid pressure within the apparatus, the control valve structure having a hand-operated lever in engagement with the control valve member, a safety valve structure having a valve member adapted to be positioned to open in response to excess pressure within the apparatus, said safety valve member having a stem carrying a spring for urging the safety valve member toward closed position, a lever on the safety valve structure cooperating with an arm of the first mentioned lever and with said valve stem to releasably hold the safety valve member in closed position.

MICHELE GUGLIELMO DE SIMONE.